United States Patent
VanBlon et al.

(10) Patent No.: US 10,241,749 B1
(45) Date of Patent: Mar. 26, 2019

(54) DYNAMICALLY CHANGING SOUND SETTINGS OF A DEVICE

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/704,466

(22) Filed: Sep. 14, 2017

(51) Int. Cl.
*G06F 3/16* (2006.01)
*H04R 29/00* (2006.01)

(52) U.S. Cl.
CPC ........... *G06F 3/165* (2013.01); *H04R 29/001* (2013.01); *H04R 2430/01* (2013.01); *H04R 2499/11* (2013.01)

(58) Field of Classification Search
CPC .... G06F 3/165; G06F 3/0484; G06F 3/04847; H04R 29/00; H04R 29/001; H04R 2430/01; H04R 2499/11
USPC ....................................... 381/56, 58, 61, 124
See application file for complete search history.

(56) References Cited

U.S. PATENT DOCUMENTS

| 2013/0310163 A1* | 11/2013 | Smith | G07F 17/3241 463/26 |
| 2015/0055801 A1* | 2/2015 | Wu | H04R 3/00 381/107 |
| 2017/0180558 A1* | 6/2017 | Li | H04M 3/568 |

* cited by examiner

*Primary Examiner* — William A Jerez Lora
(74) *Attorney, Agent, or Firm* — Kunzler, PC (57) ABSTRACT

Apparatuses, methods, systems, and program products are disclosed for dynamically changing sound settings of a device. A method includes detecting, by a processor, that one or more sound settings of an information handling device are changed. The method includes determining, in response to the one or more sound settings being changed, values for the one or more sound settings and one or more context characteristics associated with the one or more sound settings. The method includes changing, dynamically at a future time, the one or more sound settings to values corresponding to the determined values for the one or more sound settings in response to determining that the one or more context characteristics at the future time are similar to the one or more context characteristics at the time that the one or more sound settings were changed.

19 Claims, 5 Drawing Sheets

DYNAMICALLY CHANGING SOUND SETTINGS OF A DEVICE

FIELD

The subject matter disclosed herein relates to sound settings and more particularly relates to dynamically changing a device's sound settings based on context.

BACKGROUND

Devices that emit sounds may have adjustable settings for turning sounds on or off, adjusting the volume of the sounds, or the like. Situations may arise where the device's sound settings need to be adjusted, such as just prior to a meeting, but the user may forget to manually adjust the sound settings. Similarly, once the sound settings have been adjusted for a situation, the user may forget to manually revert the sound settings to their original values.

BRIEF SUMMARY

An apparatus for dynamically changing sound settings of a device is disclosed. The apparatus, in one embodiment, includes a processor and a memory that stores code executable by the processor. In one embodiment, the memory stores code executable by the processor to detect that one or more sound settings of an information handling device are changed. In a further embodiment, the memory stores code executable by the processor to determine, in response to the one or more sound settings being changed, values for the one or more sound settings and one or more context characteristics associated with the one or more sound settings. In certain embodiments, the memory stores code executable by the processor to change, dynamically at a future time, the one or more sound settings to values corresponding to the determined values for the one or more sound settings in response to determining that the one or more context characteristics at the future time are similar to the one or more context characteristics at the time that the one or more sound settings were changed.

A method for dynamically changing sound settings of a device includes detecting, by a processor, that one or more sound settings of an information handling device are changed. The method includes determining, in response to the one or more sound settings being changed, values for the one or more sound settings and one or more context characteristics associated with the one or more sound settings. The method includes changing, dynamically at a future time, the one or more sound settings to values corresponding to the determined values for the one or more sound settings in response to determining that the one or more context characteristics at the future time are similar to the one or more context characteristics at the time that the one or more sound settings were changed.

A program product, in one embodiment, includes a computer readable storage medium that stores code executable by a processor. In some embodiments, the executable code includes code to perform detecting that one or more sound settings of an information handling device are changed. The executable code includes code to perform determining, in response to the one or more sound settings being changed, values for the one or more sound settings and one or more context characteristics associated with the one or more sound settings. The executable code includes code to perform changing, dynamically at a future time, the one or more sound settings to values corresponding to the determined values for the one or more sound settings in response to determining that the one or more context characteristics at the future time are similar to the one or more context characteristics at the time that the one or more sound settings were changed.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
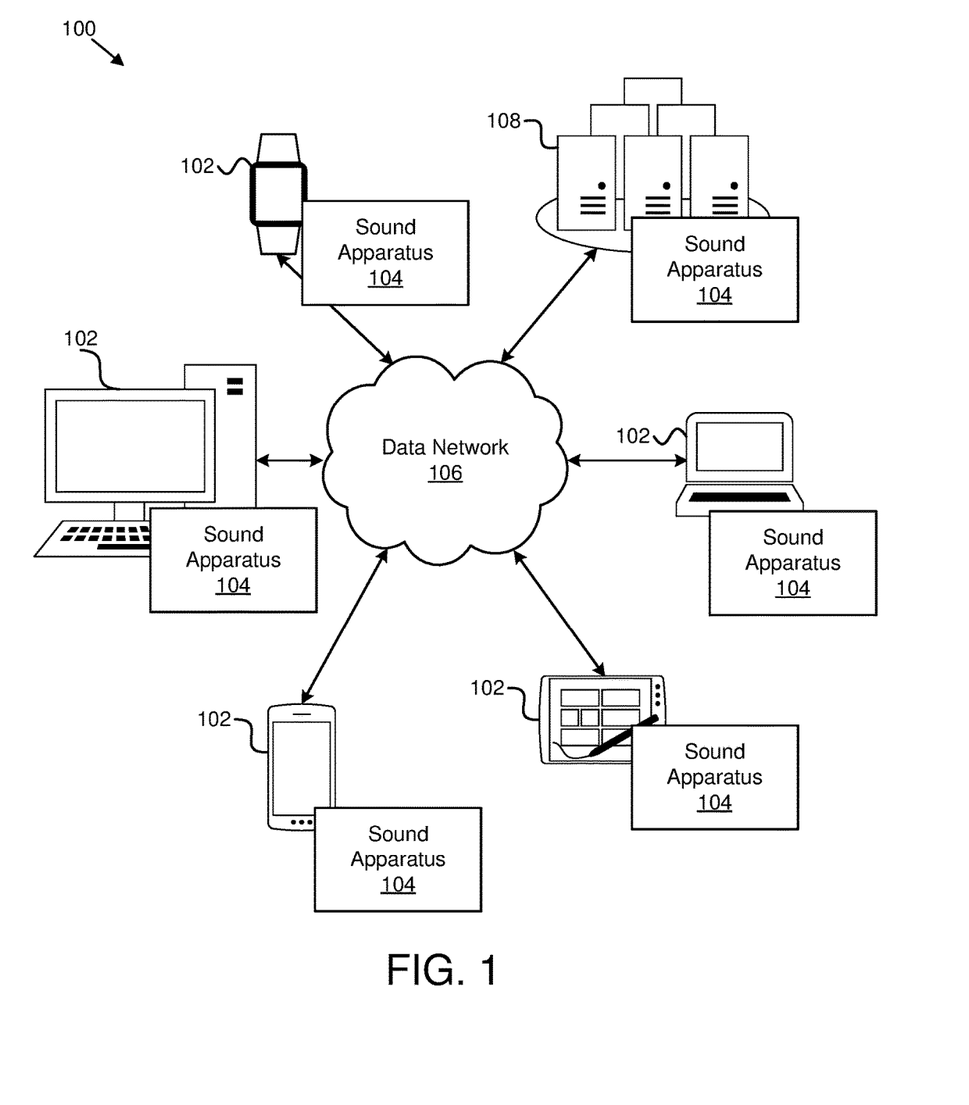
FIG. 1 is a schematic block diagram illustrating one embodiment of a system for dynamically changing sound settings of a device.

FIG. 1 is a schematic block diagram illustrating one embodiment of a system 100 for dynamically changing sound settings of a device. In one embodiment, the system 100 includes one or more information handling devices 102, one or more sound apparatuses 104, one or more data networks 106, and one or more servers 108. In certain embodiments, even though a specific number of information handling devices 102, sound apparatuses 104, data networks 106, and servers 108 are depicted in FIG. 1, one of skill in the art will recognize, in light of this disclosure, that any number of information handling devices 102, sound apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another personal computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include speakers, or other hardware, configured to produce sounds. In certain embodiments, the information handling devices 102 include vibration alert motors that generate a vibrating alert that a user can feel in place of, or in addition to, an audible notification such as a ringtone. In certain embodiments, a user may adjust the sound and vibration settings, either through software settings, e.g., through an operating system, and/or through a hardware element such as buttons for turning a volume up/down, a switch for turning the vibrating motor on/off, and/or the like.

In one embodiment, the sound apparatus 104 is configured to detect that one or more sound settings of the information handling device are changed, determine the values of the changed sound settings and one or more context characteristics associated with the sound settings, and dynamically change the sound settings at a future time to values corresponding to the determined values in response to detecting one or more context characteristics that are similar to the context characteristics that were determined at the time that the sound settings were originally changed. The sound apparatus 104, including its various sub-modules, may be located on one or more information handling devices 102 in the system 100, one or more servers 108, one or more network devices, and/or the like. The sound apparatus 104 is described in more detail below with reference to FIGS. 2 and 3.

In one embodiment, the sound apparatus 104 solves the technical problem of dynamically adjusting a device's sound settings without user input based on determining that a device's current context is similar to a previous context that was determined when the sound settings were previously changed. In other words, the sound apparatus 104 detects a device's current context and determines whether sound settings were previously changed for the same or similar context without receiving input from a user. In this manner, the sound apparatus 104 can dynamically and/or automatically change a device's sound settings without the user manually changing the sound settings in various situations, which a user is likely to forget or overlook.

In various embodiments, the sound apparatus 104 may be embodied as a hardware appliance that can be installed or deployed on an information handling device 102, on a server 108, or elsewhere on the data network 106. In certain embodiments, the sound apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the sound apparatus 104 may include a power interface, a wired and/or wireless network interface, a graphical interface that attaches to a display, and/or a semiconductor integrated circuit device as described below, configured to perform the functions described herein with regard to the sound apparatus 104.

The sound apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the sound apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the sound apparatus 104.

The semiconductor integrated circuit device or other hardware appliance of the sound apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the sound apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, such as sound settings for a device, and/or the like.

Figure 2:
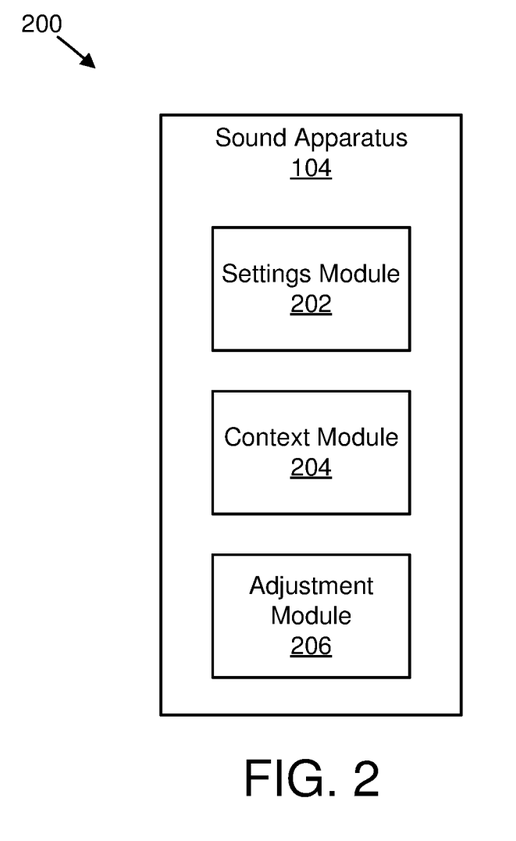
FIG. 2 is a schematic block diagram illustrating one embodiment of an apparatus for dynamically changing sound settings of a device.

FIG. 2 is a schematic block diagram illustrating one embodiment of an apparatus 200 for dynamically changing sound settings of a device. In one embodiment, the apparatus 200 includes an embodiment of a sound apparatus 104. The sound apparatus 104, in some embodiments, includes one or more of a settings module 202, a context module 204, and an adjustment module 206, which are described in more detail below.

In one embodiment, the settings module 202 is configured to detect that one or more sound settings of an information handling device 102 are changed. As used herein, a sound setting may refer to a software or hardware setting for a sound component of an information handling device 102. Examples of sound settings may include volume settings, vibration notification settings, and/or the like associated with an information handling device 102, an operating system and/or application executing on an information handling device 102, and/or the like.

The sound setting may be associated with a speaker, for example, and may determine whether the speaker is on or off, the volume level of the sounds emitted from the speaker, and/or the like. The sound setting may be configured by a user through a software setting such as via an operating system setting, an application setting, and/or the like. The sound setting may be configured by a user through a hardware component such as buttons for adjusting the volume of the sound of a device, a switch or button for muting the sound on the device, a button or switch for turning on and off a vibration alert motor, and/or the like. The sound setting may include, may be associated with, or the like, a vibration setting for a vibrating motor alarm so that a user can receive a vibration notification from the information handling device 102 in addition to an audible notification or in place of an audible notification (e.g., if the information handling device 102 is on mute).

In one embodiment, the settings module 202 detects that one or more sound settings have changed by registering for events related to the one or more sound settings. For instance, the settings module 202 may register with the operating system as a service configured to receive notifications, signals, messages, and/or the like when the volume settings of the information handling device 102 change, when the information handling device 102 is muted, when the vibration settings are changed, and/or the like.

In one embodiment, the context module 204 is configured to determine the values for the one or more sound settings after the sound settings are changed. For example, if the settings module 202 detects that the volume of the ringer on a smart phone has been turned up, the context module 204 may determine what the new value is for the ringer volume. The sound settings values, as used herein, may include numerical values (e.g., volume may be scaled from 1-10 with 1 being the quietest and 10 being the loudest), qualitative values (e.g., low, medium, high), and/or the like that describe the level of the setting.

In a further embodiment, the context module 204 determines one or more context characteristics associated with the one or more sound settings after the sound settings are changed. As used herein, context characteristics may include various factors, variables, parameters, conditions, situations, scenarios, and/or the like that may have instigated the change in the sound settings.

Examples of context characteristics may include a location, the proximity of other devices, calendar events, tasks that are repeated and can be identified or grouped, ambient noise levels, a day and/or time, whether a device is inside or outside a building, sound/volume levels, and/or the like. The context module 204 may monitor for these various factors on a continuous basis, at certain intervals, in response to a sound setting being changed, and/or the like. The context module 204 may receive data from various sensors of an information handling device 102, such as proximity sensors, noise sensors (e.g., a microphone), location sensors, and/or the like that capture environment data for the information handling device 102.

For instance, the context module 204 may monitor, track, store, and/or the like the day and time when a sound setting is changed, a location where the sound setting is changed, a calendar event or a task that may happen around the same time that the sound setting is changed, ambient noise levels when the sound setting is changed, volume levels before and after the sound setting is changed, and/or the like.

In a further embodiment, the adjustment module 206 dynamically, automatically, on-the-fly, in real-time, and/or without user-intervention, changes one or more sound settings of an information handling device 102 at a future time to values corresponding to the sound setting values that the context module 204 determines if the context module 204 detects context characteristics at the future time that are substantially similar to the context characteristics that the context module 204 determined when the sound settings were originally changed. Corresponding values may include exact values, e.g., the same values as the determined values, substantially similar values to the determined values, values within a threshold or range of the determined values, and/or the like.

For example, if the user silences his phone at church, e.g., by enabling a mute setting, by lowering the volume level to zero, or the like, the settings module 202 may detect that the sound setting for the user's phone is set to silent. In response to detecting the sound setting being set to zero, the context module 204 may take note of the setting that was changed and the value that the setting was changed to, e.g., volume set to zero, and may determine the day and time that the sound settings were changed, (e.g., Sunday at 10:00 am), may determine the location of the phone when the sound settings were changed (e.g., "at church," the physical address of the church, the GPS coordinates of the church, and/or the like), and/or the like. The following Sunday when the user goes to church, the context module 204 may determine the day and time (e.g., Sunday at 10:00 am) and the location where the user's phone is, (e.g., the church). Accordingly, the adjustment module 206 may dynamically change the phone's sound settings to set the volume to zero. In such an embodiment, the context module 204 continuously monitors for context characteristics to determine when a determined set of context characteristics matches or is similar to a previously determine set of context characteristics that are associated with sound settings that have been changed.

In one embodiment, the adjustment module 206 dynamically changes one or more sound settings of a device at the future time in response to the one or more context characteristics satisfying a threshold associated with the one or more context characteristics at the time that the one or more sound settings were changed. For example, if the context module 204 determines that the user placed his phone on silent when the decibel level of the ambient noise is around 40 dB, the adjustment module 206 may set a threshold decibel level for the ambient noise to be 40 dB or less such that if the context module 204 determines that the user is in an area where the ambient noise is 40 dB or less, the adjustment module 206 may place the user's phone in silent mode. The adjustment module 206 may set other thresholds such as location thresholds (e.g., within 100 feet of a particular location), calendar thresholds (e.g., silence phone 5 minutes before every meeting as determined based on calendar events), and/or the like.

Figure 3:
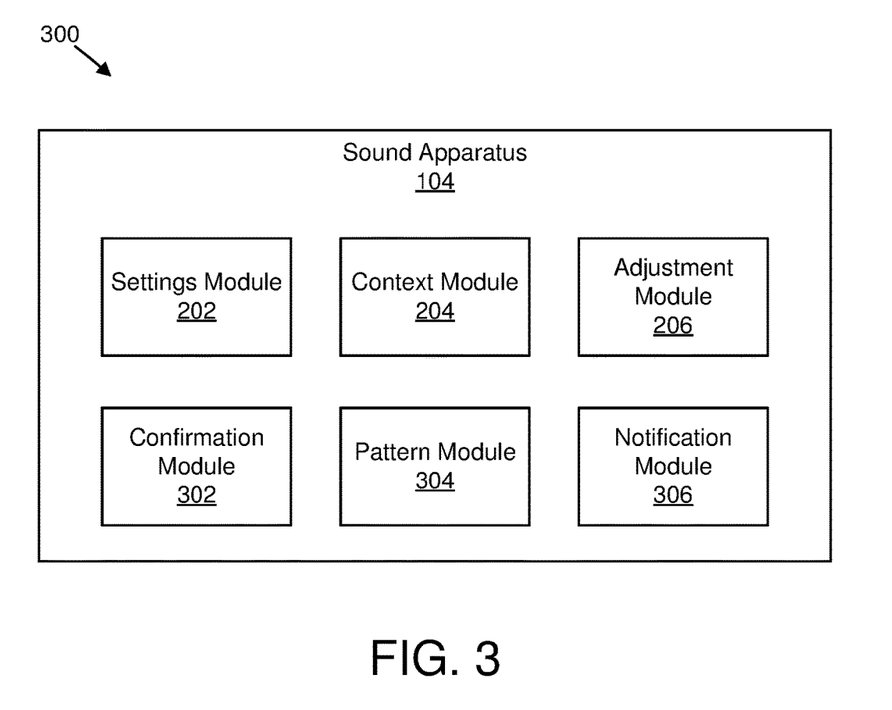
FIG. 3 is a schematic block diagram illustrating one embodiment of another apparatus for dynamically changing sound settings of a device.

FIG. 3 is a schematic block diagram illustrating one embodiment of an apparatus 300 for dynamically changing sound settings of a device. In one embodiment, the apparatus 300 includes an embodiment of a sound apparatus 104. The sound apparatus 104, in some embodiments, includes one or more of a settings module 202, a context module 204, and an adjustment module 206, which may be substantially similar to the settings module 202, the context module 204, and the adjustment module 206 described above with reference to FIG. 2. In a further embodiment, the sound apparatus 104 includes one or more of a confirmation module 302, a pattern module 304, and a notification module 306, which are described in more detail below.

The confirmation module 302, in one embodiment, is configured to receive a confirmation from a user to dynamically change the one or more sound settings at a future time based on the context characteristics that the context module 204 determines. The confirmation module 302, for example, may present a prompt such as "We noticed that you silenced your device at 10:00 am on Sunday at the ABC church. Would you like to silence your phone every Sunday at 10:00 am at ABC church?" The adjustment module 206 may then change the sound setting every Sunday at 10:00 am at ABC church in response to receiving a confirmation from the user to do so.

For example, if the user silences his phone while eating dinner with his family, the settings module 202 may detect that a user silenced his phone, and the context module 204 may determine the volume setting, in addition to the location, the time of day, and one or more other devices, e.g., family members' devices, that are within a proximity of the user's phone. The confirmation module 302 may present a prompt such as "Do you want to silence your phone at 6:00 pm Monday night when these other devices are present?" If so, then the adjustment module 206 may dynamically silence the user's phone every Monday night at 6:00 pm.

In certain embodiments, the confirmation module 302 receives one or more adjustments, modifications, changes, customizations, and/or the like for the one or more sound settings values and/or the one or more context characteristics used for changing the one or more sounds settings at a future time. For instance, the confirmation module 302 may allow the user to simply reject the prompt or to configure context characteristics that trigger the dynamic adjustment of the sound settings.

Continuing with the previous example, the confirmation module 302 may allow the user to specify that the phone should be silenced not just on Monday night, but Monday-Thursday nights between the times of 5:30 and 7:30 pm, and only when the user's spouse's device is in proximity of the user's device. Similarly, looking at the church example above, the confirmation module 302 may prompt the user as to whether the user would like to silence his phone at this particular church or at all churches, or receive a larger radius or distance from the church to trigger silencing the phone, and/or the like. The confirmation module 302 may provide various user interfaces for allowing the user to customize the context characteristics for when the sound settings should be modified.

In another example, the user may place her phone in vibrate mode, which may enable the vibration alarm motor and also silence the phone, at a loud restaurant so that the user can feel notifications via the vibration. The context module 204 may determine the decibel level of the ambient noise, using one or more sensors on the user's device, and associate the determined decibel level with placing the device in vibrate mode. The confirmation module 302 may prompt the user to confirm that she wants to automatically put in phone in vibrate mode when the decibel level of ambient noise is detected to be greater than or equal to the determined decibel level when she placed the phone in vibrate. The user may confirm the prompt that the confirmation module 302 presents, or may adjust the decibel level when the phone is placed in vibrate mode to a larger range of levels, for example. The user may also specify that it should be placed in vibrate at this particular restaurant, or at all restaurants, or the like.

In another example, a user may lower the volume of her laptop computer at work. In response to the user lowering the volume, the context module 204 may determine the volume level, and other context characteristics that may affect the user lowering the volume on her laptop. For instance, the user may be at work, and the context module 204 may determine the user's location as a work location, may determine the time of day when the volume was lowered, may determine whether a meeting was scheduled on the calendar for the time that the volume was lowered, and/or the like. Accordingly, the confirmation module 302 may prompt the user to confirm whether the user would like to lower the volume to the determined volume level on her laptop whenever she is at work, or at the particular time, or when a meeting is scheduled, and/or the like.

In certain embodiments, the confirmation module 302 generates and presents one or more recommendations to the user for dynamically adjusting the user's device's sound settings. For instance, in the restaurant example above, the confirmation module 302 may recommend always placing the user's phone in vibrate mode when the decibel level of the ambient noise is at or above the decibel level that was determined when the user placed the phone in vibrate mode, instead of only dynamically placing the user's phone in vibrate mode at that particular restaurant when the decibel level of the ambient noise is at or above the decibel level that was determined when the user placed the phone in vibrate mode. The confirmation module 302 may present a plurality of different recommendations to the user, which the user can select from, or as discussed above, customize the settings for dynamically changing the sound settings.

The pattern module 304, in one embodiment, is configured to establish, generate, create, recognize, and/or the like one or more context patterns based on the one or more context characteristics that the context module 204 determines. As used herein, a context pattern may refer to a pattern that describes when the sound settings are changed on a device based on the context characteristics. In one embodiment, the pattern module 304 may track or learn, over time, the scenarios or situations when a user is likely to change sound settings according to the context characteristics associated with a sound change.

In a simple example, the pattern module 304 may recognize that the user changes the sound settings of his smart phone to vibrate every Monday-Friday between 8:00 am and 9:00 am, and turns the phone's sound back on after 5:00 pm. The pattern module 304 may determine, based on the context characteristics such as the user's location, the time and days, other calendar events, or the like, that the user is at work and silences his phone while he is at work Monday through Friday. Based on this context pattern, the confirmation module 302 can provide a more accurate prompt to confirm that the user would like to turn their phone on vibrate every week day between 8:00 am and 5:00 pm, and turn the sound back on after 5:00 pm. The confirmation module 302 may also use this information to provide recommendations to the user such as a recommendation to silence their phone during working hours on week days, and turn the sound on after work hours during week days.

In certain embodiments, the pattern module 304 learns context patterns over time from the context characteristics associated with sound setting changes and automatically, e.g., without receiving confirmation from the user, changes a device's sound settings based on current context characteristic information matching one or more learned context patterns. For instance, looking at the previous example, instead of prompting the user to confirm that the user wants to silence their phone during working hours on week days, the adjustment module 206 may automatically silence the user's phone without receiving a confirmation first from the user to do so based on the context patterns that the pattern module 304 learns over time.

In one embodiment, the adjustment module 206 may delay changing the sound settings for a device until a context pattern can be established that satisfies a threshold pattern confidence. For instance, if a user silences his device on a Saturday at 2:00 pm at a park, as determined according to the context characteristics collected when the sound setting was changed, the pattern module 304 may not be able to confidently generate a context pattern such as that the user silences their phone every 2:00 pm on Saturday, or silences their phone at this park or at any parks, or the like, until more context characteristic information can be determined. On the other hand, if the user has a history of silencing their phones at parks, or at this particular park, or on Saturdays at 2:00 pm, then the pattern module 306 may determine a context pattern for this user's behavior for silencing the user's phone, which the adjustment module 206 and/or the confirmation module 302 can act upon.

In some embodiments, the pattern module 304 may generate a broad context pattern based on a plurality of more specific context patterns that are generated based on the context characteristics. For example, if the pattern module 304 has three different context patterns for silencing a user's phone at three different restaurants on different days and times, the pattern module 304 may generate a general context pattern to replace three different context patterns for silencing the phone at all restaurants that have similar characteristics to each of the three different restaurants. For instance, if the restaurants are all three- or four-star restaurants, or are owned by the same company or chef, or are within a certain price range, or the like, the pattern module 304 may generate and recommend the general pattern context for silencing the user's phone at these and similar restaurants.

In one embodiment, the notification module 306 generates notifications, confirmation prompts, and/or the like associated with a sound setting to present to the user. The notification module 306, for example, may generate a toast message/notification, a push notification, a text message, an email, a chat message, and/or the like. The notification module 306 may deliver the notification that a sound setting has changed, will change, is about to change, or the like, at the time that the adjustment module 206 changes a sound setting, after the pattern module 304 recognizes a particular context pattern, after the pattern module 304 determines that the current context pattern is no longer applicable, and/or the like. The confirmation module 302 may communicate with the notification module 306 to create and send confirmation prompts, and receive user feedback in response to the confirmation prompts.

Figure 4:
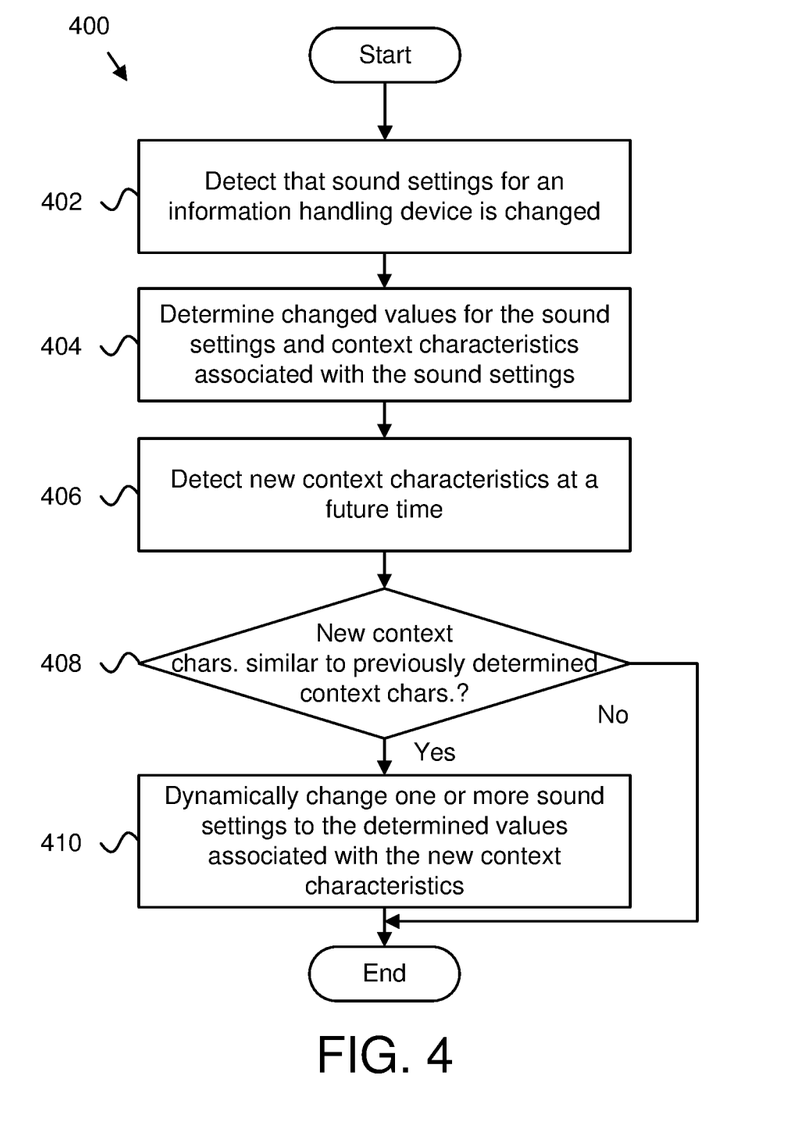
FIG. 4 is a schematic flow chart diagram illustrating one embodiment of a method for dynamically changing sound settings of a device.

FIG. 4 is a schematic flow chart diagram illustrating one embodiment of a method 400 for dynamically changing sound settings of a device. In one embodiment, the method 400 begins and the settings module 202 detects 402 that one or more sound settings of an information handling device 102 are changed. In a further embodiment, the context module 204 determines 404, in response to the sound settings being changed, one or more values for the changed sound settings and one or more context characteristics associated with the sound settings.

In a further embodiment, the context module 204 detects 406 one or more new context characteristics at a future time. If the context module 204 determines 408 that the new context characteristics are similar to previous context characteristics that were collected when one or more sound settings were changed, then the adjustment module 206 dynamically changes 410 the one or more sound settings to values corresponding to the determined values for the one or more sound settings that are associated with the new context characteristics, and the method 400 ends.

Figure 5:
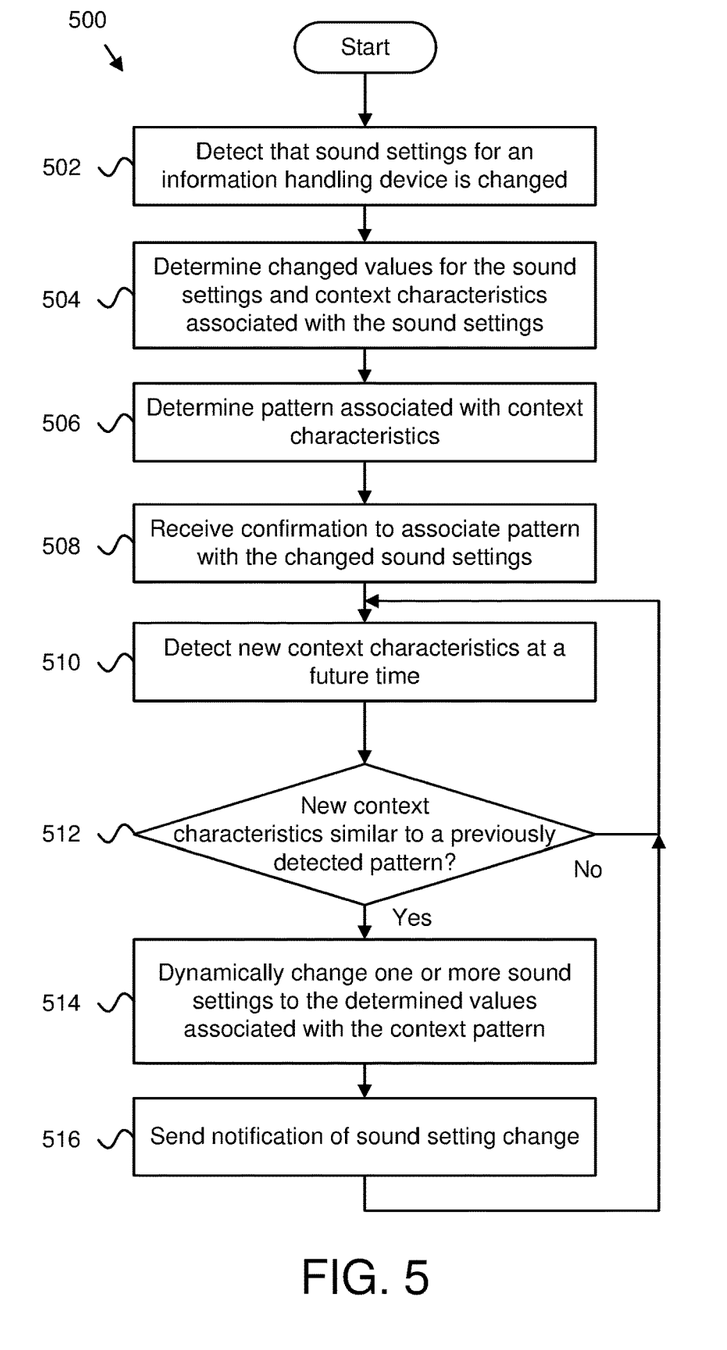
FIG. 5 is a schematic flow chart diagram illustrating one embodiment of another method for dynamically changing sound settings of a device.

FIG. 5 is a schematic flow chart diagram illustrating one embodiment of another method 500 for dynamically changing sound settings of a device. In one embodiment, the method 500 begins and the settings module 202 detects 502 that one or more sound settings of an information handling device 102 are changed. In a further embodiment, the context module 204 determines 504, in response to the sound settings being changed, one or more values for the changed sound settings and one or more context characteristics associated with the sound settings.

In some embodiments, the pattern module 304 determines 506 one or more context patterns based on the context characteristics such as silencing a phone in a movie theatre, turning the volume up when the ambient noise is above a threshold level, turning the phone on vibrate just before a schedule meeting, and/or the like. The confirmation module 302, in one embodiment, receives 508 a confirmation from the user to associate the determined context pattern with the changed sound settings so that the sound settings will be dynamically or automatically changed in the future when a similar context pattern is detected.

In one embodiment, the context module 204 detects 510 one or more context characteristics at a future time. If the pattern module 304 determines 512 that the new context characteristics are similar to a previously determined context pattern associated with changing sound settings of a device, the adjustment module 206 dynamically changes 514 the one or more sound settings to values corresponding to the determined values for the one or more sound settings that are associated with the context pattern. The notification module 306, in one embodiment, sends 516 or presents a notification that one or more sound settings have been changed. Otherwise, the context module 204 continues to detect 510 new context characteristics.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
   a processor of an information handling device;
   a memory of the information handling device that stores code executable by the processor to:
      detect that one or more sound settings of the information handling device are changed;
      determine, in response to the one or more sound settings being changed:
         values for the one or more sound settings; and
         one or more context characteristics associated with the one or more sound settings; and
      change, dynamically at a future time, the one or more sound settings to values corresponding to the determined values for the one or more sound settings in response to determining that the one or more context characteristics at the future time are similar to the one or more context characteristics at the time that the one or more sound settings were changed, wherein at least one of the one or more context characteristics is selected from the group consisting of one or more proximate devices, one or more calendar events, one or more tasks, and ambient noises.

2. The apparatus of claim 1, further comprising code executable by the processor to receive confirmation to dynamically change the one or more sound settings at the future time based on the one or more context characteristics.

3. The apparatus of claim 1, further comprising code executable by the processor to receive adjustments to one or more of the one or more sound settings and the one or more context characteristics used for changing the one or more sound settings at the future time.

4. The apparatus of claim 1, further comprising code executable by the processor to present one or more recommendations for dynamically changing the one or more sound settings at the future time based on the one or more context characteristics.

5. The apparatus of claim 1, further comprising code executable by the processor to dynamically change the one or more sound settings at the future time in response to the one or more context characteristics satisfying a threshold associated with the one or more context characteristics at the time that the one or more sound settings were changed.

6. The apparatus of claim 1, further comprising code executable by the processor to continuously:
   monitor the one or more context characteristics associated with the one or more sound settings;
   establish one or more patterns for changing the one or more sound settings at the future time based on the context characteristics and the changed values for the one or more sound settings in response to detecting that the one or more sound settings are changed; and
   dynamically change the one or more sound settings at the future time in response to determining that the monitored one or more context characteristics matches one or more patterns.

7. The apparatus of claim 6, further comprising code executable by the processor to delay changing the one or more sound settings at the future time until a pattern is established based on the one or more context characteristics.

8. The apparatus of claim 1, further comprising code executable by the processor to send a notification that the one or more sound settings changed in response to the one or more sound settings being changed at the future time.

9. The apparatus of claim 1, further comprising one or more sensors of the information handling device, the one or more sensors capturing environment data as part of the one or more context characteristics.

10. The apparatus of claim 1, wherein the one or more sound settings are selected from the group consisting of a volume setting and a vibration setting.

11. A method comprising:
    detecting, by a processor, that one or more sound settings of an information handling device are changed;
    determining, by a processor, in response to the one or more sound settings being changed:
        values for the one or more sound settings; and
        one or more context characteristics associated with the one or more sound settings; and
    changing, by a processor, dynamically at a future time, the one or more sound settings to values corresponding to the determined values for the one or more sound settings in response to determining that the one or more context characteristics at the future time are similar to the one or more context characteristics at the time that the one or more sound settings were changed, wherein at least one of the one or more context characteristics is selected from the group consisting of one or more proximate devices, one or more calendar events, one or more tasks, and ambient noises.

12. The method of claim 11, further comprising receiving confirmation to dynamically change the one or more sound settings at the future time based on the one or more context characteristics.

13. The method of claim 11, further comprising receiving adjustments to one or more of the one or more sound settings and the one or more context characteristics used for changing the one or more sound settings at the future time.

14. The method of claim 11, further comprising presenting one or more recommendations for dynamically changing the one or more sound settings at the future time based on the one or more context character.

15. The method of claim 11, further comprising dynamically changing the one or more sound settings at the future time in response to the one or more context characteristics satisfying a threshold associated with the one or more context characteristics at the time that the one or more sound settings were changed.

16. The method of claim 11, further comprising continuously:
    monitoring the one or more context characteristics associated with the one or more sound settings;
    establishing one or more patterns for changing the one or more sound settings at the future time based on the context characteristics and the changed values for the one or more sound settings in response to detecting that the one or more sound settings are changed; and
    dynamically changing the one or more sound settings at the future time in response to determining that the monitored one or more context characteristics matches one or more patterns.

17. The method of claim 16, further comprising delaying changing the one or more sound settings at the future time until a pattern is established based on the one or more context characteristics.

18. The method of claim 11, further comprising sending a notification that the one or more sound settings changed in response to the one or more sound settings being changed at the future time.

19. A program product comprising a non-transitory computer readable storage medium that stores code executable by a processor, the executable code comprising code to perform:
    detecting that one or more sound settings of an information handling device are changed;
    determining, in response to the one or more sound settings being changed:
        values for the one or more sound settings; and
        one or more context characteristics associated with the one or more sound settings; and
    changing, dynamically at a future time, the one or more sound settings to values corresponding to the determined values for the one or more sound settings in response to determining that the one or more context characteristics at the future time are similar to the one or more context characteristics at the time that the one or more sound settings were changed, wherein at least one of the one or more context characteristics is selected from the group consisting of one or more proximate devices, one or more calendar events, one or more tasks, and ambient noises.

* * * * *